United States Patent
Medina-Garcia et al.

(10) Patent No.: US 12,531,488 B2
(45) Date of Patent: Jan. 20, 2026

(54) ASYMMETRIC HALF BRIDGE FLYBACK CONVERTER

(71) Applicant: Infineon Technologies Austria AG, Villach (AT)

(72) Inventors: Alfredo Medina-Garcia, Munich (DE); Martin Krüger, Oberschleißheim (DE); Marc Fahlenkamp, Geretsried (DE)

(73) Assignee: Infineon Technologies Austria AG, Villach (AT)

( * ) Notice: Subject to any disclaimer, the term of this patent is extended or adjusted under 35 U.S.C. 154(b) by 236 days.

(21) Appl. No.: 18/209,779

(22) Filed: Jun. 14, 2023

(65) Prior Publication Data

US 2024/0007000 A1    Jan. 4, 2024

(30) Foreign Application Priority Data

Jun. 29, 2022    (EP) .................................. 22181816

(51) Int. Cl.
*H02M 3/335* (2006.01)
*H02M 3/00* (2006.01)
*H02M 1/08* (2006.01)

(52) U.S. Cl.
CPC ......... *H02M 3/33571* (2021.05); *H02M 3/01* (2021.05); *H02M 1/08* (2013.01)

(58) Field of Classification Search
CPC ...... H02M 1/0048; H02M 1/08; H02M 1/088; H02M 3/01; H02M 3/335–33523; H02M 3/33569; H02M 3/33571
See application file for complete search history.

(56) References Cited

U.S. PATENT DOCUMENTS

| | | | |
|---|---|---|---|
| 10,170,974 B1* | 1/2019 | Oh | .......................... H02M 1/32 |
| 2020/0112257 A1 | 4/2020 | Fahlenkamp et al. | |
| 2022/0271674 A1* | 8/2022 | Yang | .................. H02M 3/33571 |
| 2023/0006544 A1* | 1/2023 | Yang | .................. H02M 3/33576 |
| 2023/0344359 A1* | 10/2023 | Yeh | ...................... H02M 1/0009 |

FOREIGN PATENT DOCUMENTS

| | | |
|---|---|---|
| CN | 104779806 A | 7/2015 |
| CN | 113659837 A | 11/2021 |

OTHER PUBLICATIONS

Ding Xiaofeng, et al.., "A review of gallium nitrade power device and its applications in motor drive" CES Transactions on Electrical Machines and Systems, vol. 3, No. 1, Mar. 31, 2019, pp. 54-64, XP-093001739.
Extended Search Report, EP 22 18 1816, Nov. 24, 2022, pp. 1-10.

\* cited by examiner

*Primary Examiner* — Fred E Finch, III
(74) *Attorney, Agent, or Firm* — Armis IP Law, LLC (57) ABSTRACT

An asymmetric half bridge flyback converter, comprising a first primary side switching device and a second primary side switching device coupled in series between a supply voltage and a reference potential, a transformer, wherein one end of a primary side winding of the transformer is coupled to a node between the first primary side switching device and the second primary side switching device, a capacitor, wherein a resonant circuit including at least the primary side winding and the capacitor is coupled in parallel to the second primary side switching device, and a controller controlling the switches devices. The second primary side switching device is configured to prevent or reduce current flow in both directions when switched off.

23 Claims, 8 Drawing Sheets

ASYMMETRIC HALF BRIDGE FLYBACK CONVERTER

RELATED APPLICATION

This application claims priority to earlier filed European Patent Application Serial Number EP22181816 entitled "ASYMMETRIC HALF BRIDGE FLYBACK CONVERTER," filed on Jun. 29, 2022, the entire teachings of which are incorporated herein by this reference.

TECHNICAL FIELD

The present application relates to asymmetric half bridge flyback converters.

BACKGROUND

Flyback converters are a type of voltage converters which provide galvanic isolation between and input and any output. A specific type of flyback converter is an asymmetric half bridge flyback converter, also sometimes referred to as asymmetric pulse-width modulation (PWM) half bridge flyback converter, also referred to as AHB flyback converter. An AHB flyback converter is essentially a converter with an inductor of the converter being split to form a transformer, such that voltage ratios are multiplied based on a winding ratio of the transformer with an additional advantage of isolation.

Such an AHB flyback converter includes a half bridge comprising a high-side switching device and a low-side switching device. One of the high-switch and the low-side switching device is coupled in parallel to what is sometimes referred to as resonant tank, the resonant tank including at least stray inductances of the transformer, in particular of a primary side winding thereof, and a resonant capacitor, and sometimes an additional inductor. The high-side switching device and the low-side switching device are alternatingly switched on and off. In a first phase the switching device of the half bridge not coupled in parallel to the resonant tank is switched on, and energy is transferred from an input voltage source to the resonant tank. Then, in a second phase when the switching device parallel to the resonant tank is switched on and the other switching device of the half bridge is switched on, energy is transferred to a secondary side of the transformer to provide an output voltage. After this second phase, in some cases a third phase follows, where a full demagnetization occurs.

Some AHB flyback converters are designed for a wide range of output voltages. The time needed for the full demagnetization may depend on the output voltage. On the other hand, a resonance period of the resonant tank may be largely independent from output voltage.

In some conventional solutions, therefore the resonant capacitor is varied depending on output voltage, to avoid losses due to high currents at low output voltages. However, this solution requires an adjustable capacitor and a corresponding control thereof.

BRIEF DESCRIPTION

An asymmetric half bridge flyback converter as defined in claim 1 is provided. The dependent claims define further embodiments.

According to an embodiment, an asymmetric half bridge flyback converter is provided, comprising:

a first primary side switching device and a second primary side switching device coupled in series between a supply voltage and a reference potential, a transformer, wherein one end of a primary side winding of the transformer is coupled to a node between the first primary side switching device and the second primary side switching device, a capacitor, wherein a resonant circuit including at least the primary side winding and the capacitor is coupled in parallel to the second primary side switching device, and a secondary side circuit coupled to a secondary side winding of the transformer.

The asymmetric half bridge flyback converter further comprises a controller configured to control the first primary side switching device and the second primary side switching device such that for each switching cycle:

in a first phase, the first primary side switching device allows current flow and the second primary side switching device blocks current flow in a first direction to supply power to the resonant circuit, in a second phase, the first primary side switching device blocks current flow and the second primary side switching device allows current flow, to transfer energy to the secondary side circuit, and in a third phase, the first primary side switching device blocks current flow and the second primary side switching device blocks current flow also in a second direction opposite the first direction such that a remaining magnetizing energy of the transformer is discharged to the secondary side of the transformer.

Further embodiments herein include an apparatus comprising: a controller operative to: control operation of a first switch and a second switch to supply input current to a resonant circuit path including a primary winding of a transformer and a capacitor, a secondary winding of the transformer operative to produce an output current supplied to a load; and wherein the controlled operation in a respective control cycle of controlling the first switch and the second switch includes deactivation of both the first switch and the second switch in a portion of the respective control cycle during which magnetizing energy associated with the primary winding of the transformer is discharged through the transformer to produce the output current.

The above brief description is merely intended to give a brief overview over some features and is not to be construed as limiting.

DETAILED DESCRIPTION

In the following, various embodiments will be described in detail referring to the attached drawings. These embodiments are given as examples only and are not to be construed as limiting in any way. For example, while embodiments may be described as comprising a plurality of features (for example components, devices, elements, acts, events etc.), this is not to be construed as limiting, and in other embodiments some of the features may be omitted, and/or may be replaced by alternative features. In addition to the features explicitly described, further features, for example features conventionally provided in flyback converters like asymmetric half bridge flyback converters, for example protection mechanisms or feedback controls, may be used. Another example are further converter stages in addition to the flyback converters described herein. For example, sometimes a flyback converter is combined with a preceding power factor correction (PFC) stage, and such an additional PFC stage or also more than one than one additional stage may also be provided to the embodiments described herein. Also, for example regulation of an output voltage or output current of the converter may be implemented in any conventional manner and is therefore not described in detail. In other words, apart from specifics described herein, flyback converters may be implemented in a conventional manner in in conventional environments, and such conventional features will not be described in greater detail.

Different embodiments may be combined with each other to form further embodiments unless noted otherwise. Variations and modifications described with respect to one of the embodiments may also be applicable to other embodiments.

Connections or couplings shown in the drawings or described herein refer to electrical connections or couplings unless noted otherwise. In the embodiments shown and described, any direct electrical connection or coupling between elements, i.e. connections or couplings without intervening elements, may be replaced by an indirect connection or coupling, i.e. a connection or coupling comprising one or more additional intervening elements, and vice versa as long as the purpose of the connection or coupling, for example to provide a certain kind of signal, a certain kind of information or a certain kind of control, is essentially maintained. In other words, connections or couplings may be modified as long as the general purpose and function of the connection or coupling remains essentially unaltered.

Figure 1:
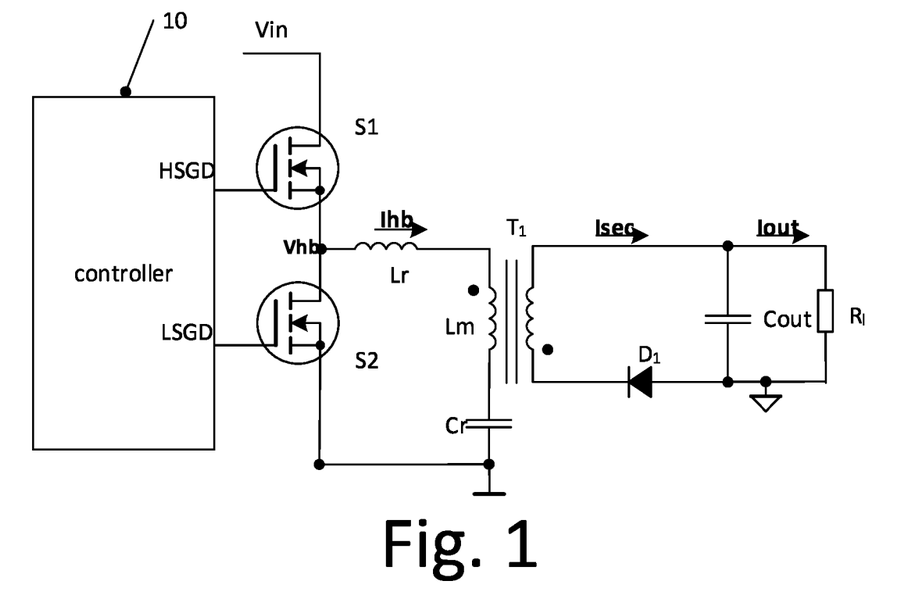
FIG. 1 is a circuit diagram of a flyback converter according to an embodiment.

Turning now to the Figures, FIG. 1 is a circuit diagram illustrating an asymmetric half bridge flyback converter according to an embodiment. As embodiments discussed herein generally relate to such asymmetric half bridge flyback converters, they will simply be referred to as flyback converters in the following. The flyback converter of FIG. 1 comprises a controller 10 configured to control a primary side high-side switching device S1 via a control signal HSGD and a primary side low-side switching device S2 via a control signal LSGD. High-side switching device S1 and low-side switching device S2 form a half bridge coupled in series between a direct current (DC) input voltage Vin and a reference voltage, for example ground, as shown. In implementations with a plurality of stages, Vin may for example be a bus voltage delivered by a power factor correction stage.

A voltage Vhb at a node between high-side switching device S1 and low-side switching device S2 is applied to a resonant tank including a primary side winding Lm of a transformer $T_1$ as a first inductor, a resonant capacitor Cr and a second inductor Lr. It should be noted that inductor Lr is optional and may be omitted in other embodiments. Therefore, a first end of primary side winding Lm is coupled to the node between high-side switching device S1 and low-side switching device S2 (via inductor Lr, if present), and a second end of primary side winding Lm is coupled to ground via a resonant capacitor Cr.

A secondary side of the flyback converter including an output capacitor Cout and a rectifying diode $D_1$ is coupled to a secondary side winding of transformer $T_1$. Primary side winding Lm and the secondary side winding, as indicated by dots, have opposite winding directions. The opposite winding direction of primary side winding Lm and the secondary side winding is typical for asymmetric half bridge flyback converters.

A leakage inductor of transformer $T_1$, in particular of primary side winding Lm, resonant capacitor Cr, is present, inductor Lr form a LC resonator, also referred to as resonant tank herein.

A current flowing through the resonant tank via inductor Lr is labelled Ihb in FIG. 1, a current flowing through output capacitor Cout is labelled Isec and is also referred to a secondary side current herein, and an output current flowing to a load, symbolized by a resistor R1, is labelled Tout in FIG. 1.

Controller 10 may be control high-side switching device S1 and low-side switching device S2 as explained further below in more detail. Controller 10 may be implemented for example using an application specific integrated circuit, a programmed microcontroller or the like.

In conventional implementations of such a flyback converter as shown in FIG. 1, high-side switching device S1 and low-side switching device S2 are implemented as silicon based MOSFET transistors (metal oxide semiconductor field effect transistors). MOSFETs typically have a body diode, which has the consequence that they are essentially unidirectional switches, which when switched off, block current in one direction, but allow current flow in the opposite direction (also referred to as reverse direction herein) via the body diode. Other transistor implementations may have other reverse diode conducting paths, i.e. paths over a diode, than a body diode. While body diodes are used as examples herein, the explanations given herein also apply to such other reverse diode conducting paths.

In contrast to such conventional solutions, at least low-side switching device S2 is implemented such that current flow is also suppressed, reduced or blocked in the reverse direction. As will be explained below, this may for example be achieved by implementing at least low-side switching device S2 as a transistor based on a wide bandgap material like a Gallium Nitride based transistor, or as a bidirectional switch using two MOSFET transistors. High-side switch S1 may be implemented in a conventional manner as a MOSFET, or may also be implemented as low-side switch S2, suppressing current also in the reverse direction.

For explaining the effects of such an implementation of low-side switching device S2, the operation of the flyback converter will be described referring to FIGS. 2, 3A to 3D and 4A to 4F. FIGS. 4A to 4F show various signal diagrams for illustration purposes. It should be noted that the signal waveforms shown are to be seen merely as illustrative examples, as actual signal waveforms may vary depending on dimensioning and implementation of the flyback converter.

Figure 2:
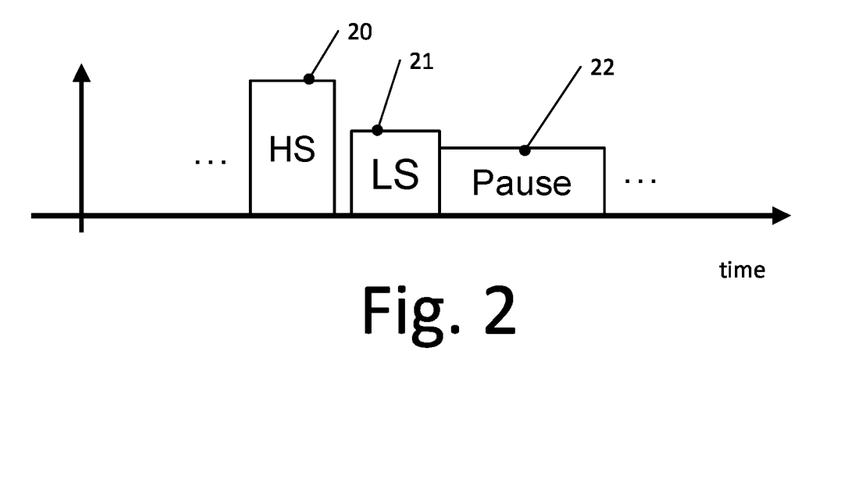
FIG. 2 is a diagram illustrating control of the flyback converter of FIG. 1.

FIG. 2 schematically illustrates a control of the flyback converter of FIG. 1 during one switching cycle, including phases 20 to 22. In operation of the flyback converter, a plurality of such switching cycles are repeated. The length of phases 20 to 22 may be regulated based on a desired output voltage, output current and/or output power in any conventional manner.

Figure 3A:
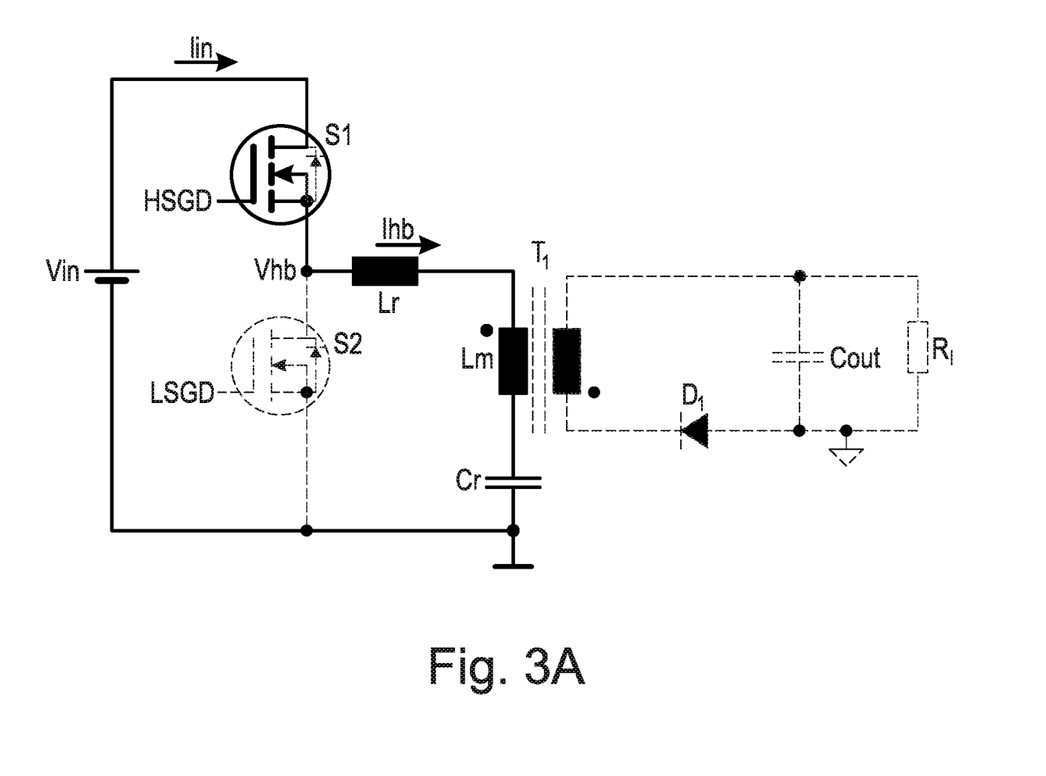
FIG. 3A illustrates a first phase of the control of FIG. 2.

In first phase 20, high-side switching device S1 is switched on to allow current flow, whereas low-side switching device S2 is switched off to block current flow. The corresponding situation is shown in FIG. 3A. Compared to FIG. 1, in FIGS. 3A to 3D controller 10 is omitted, and the input voltage Vin is represented as a battery.

The first phase 20 is also referred to as charge phase. As shown in FIG. 3A, here an input current Iin flows via high-side switching device S1 to the resonant tank including components Lr, Lm and Cr, i.e. the resonant tank is charged.

Returning to FIG. 2, after first phase 20 a second phase 21 follows, where high-side switching device S1 blocks is controlled by controller 10 to block further current flow from the input voltage Vin to the resonant tank, i.e. is switched off, and low-side switching device S2 is switched on to allow current flow. Between the first phase 20 and the second phase 21, usually a short dead time is inserted, where both switching devices S1 and S2 block current flow to prevent an accidental short circuit from Vin to ground.

Figure 3B:
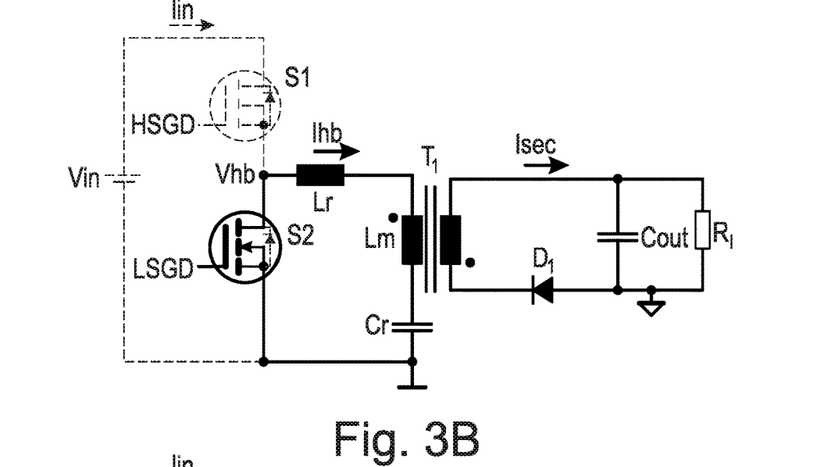
FIG. 3B illustrates a second phase of the control of FIG. 2.

This second phase is also referred to as resonant phase and is illustrated in FIG. 3B. Here, due to the stored energy in the resonant tank, a current Ihb still flows, generating a secondary side current Isec and thus ultimately supplying the load R1 with power.

Figure 3C:
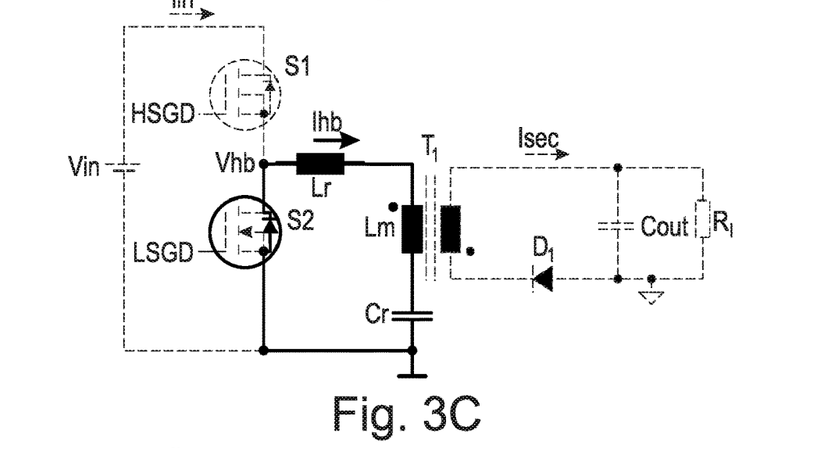
FIG. 3C illustrates a third phase of the control of FIG. 2 for a reference example.

Returning to FIG. 2, following second phase 21 a pause phase 22 follows where both high-side switching device S1 and low-side switching device S2 are switched off. The behaviour in this phase differs between conventional solutions and embodiments discussed herein. For a better explanation, FIG. 3C illustrates the behaviour in the third phase for conventional solutions, and FIG. 3D illustrates the behaviour in embodiments.

Generally, during the third phase a remaining magnetization, i.e. a magnetization still remaining in primary side winding Lm (and in inductor Lr, if present) after second phase 21, is discharged.

In a conventional solution, as mentioned above the low-side switching device S2 is implemented using a MOSFET transistor. Here, as illustrated in FIG. 3C, even if low-side switching device S2 is switched off, current still can flow via the body diode of low-side switching device S2. Therefore, in this case the discharge occurs to capacitor Cr and through a current within the resonant circuit, and the secondary side current Isec stops.

Figure 3D:
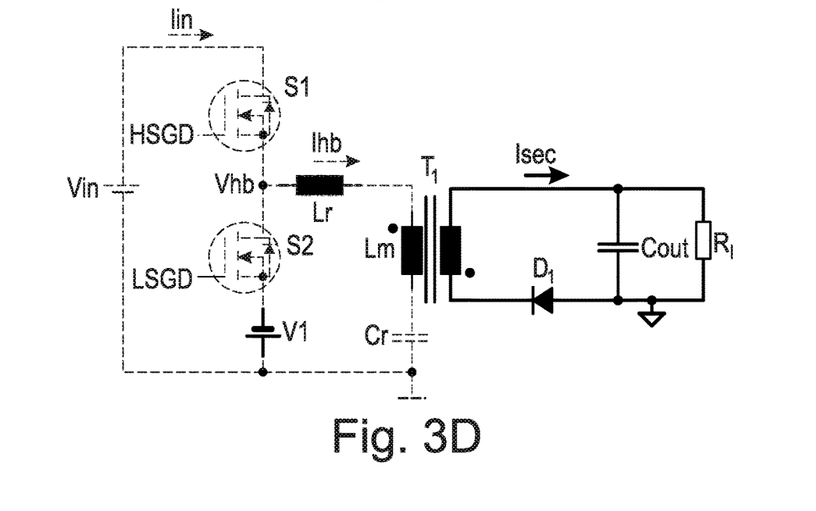
FIG. 3D illustrates a third phase of the control of FIG. 2 according to some embodiments.

In contrast thereto, in embodiments as discussed herein, as shown in FIG. 3D low-side switching device S2 is designed to prevent such a current flow, which is referred to as a current flow in the reverse direction herein. In FIG. 3D, this property of low-side switching device S2 is symbolized by a voltage V1, which is a voltage "against" the current flow in FIG. 3C thus preventing it. In this case, the discharge in the third phase 22 occurs via transformer $T_1$ to the secondary side, causing a secondary side current Isec to flow. Thus, the energy corresponding to the remaining magnetization is still used.

The effects this configuration of low-side switching device S2 as explained with reference to FIG. 3D has will now be explained using example signals and graphs shown in FIGS. 4A to 4F.

Figure 4A:
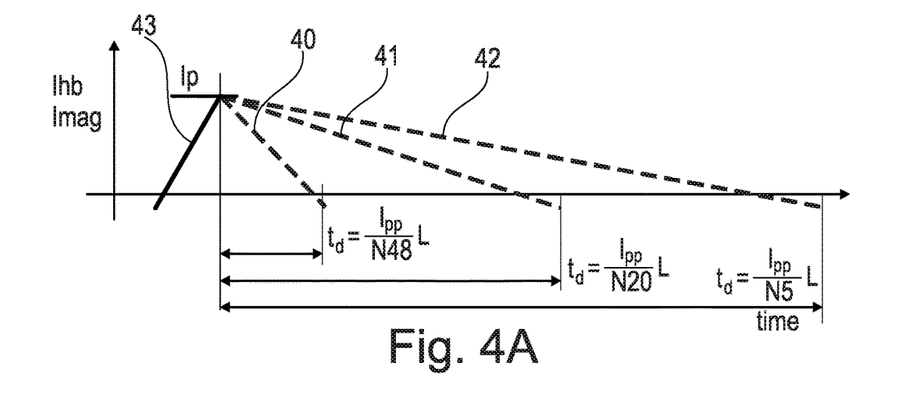
FIGS. 4A to 4F are signal diagrams for illustrating embodiments.

FIG. 4A illustrates the demagnetization time depending on output voltage. In the first phase, according to solid curve 43 the current Ihb rises until a positive absolute peak current Ip (i.e. the highest positive current value) is reached. Then, in the second and third phases the magnetizing current Imag decreases according to curves 40 to 42 within respective times td. Generally, the time $t_d$ is equal to $I_{pp}$ L/Vcr. $I_{pp}$ is the peak to peak current value, corresponding to the difference between Ip marked in the curves of the example and the lowest current value, L is the overall inductance of the resonant tank (with contributions of Lr and Lm in FIG. 1), and Vcr is the voltage at the resonant capacitor Cr of FIG. 1. As this voltage Vcr is approximately equal to N×Vout, wherein N is the turns ratio of transformer $T_1$ and Vout is the output voltage, the time $t_d$ is equal to $I_{pp}$×L/(N×Vout), or for a fixed peak voltage, inversely proportional to the output voltage Vout. In the example shown, curve 40 is an example current behaviour of the magnetizing current Imag for an output voltage of 48V, curve 41 is an example current Imag for an output voltage of and curve 42 is an example current Imag for an output voltage of 5V. As can be seen, for low output voltages the demagnetization time becomes quite long.

Figure 4B:
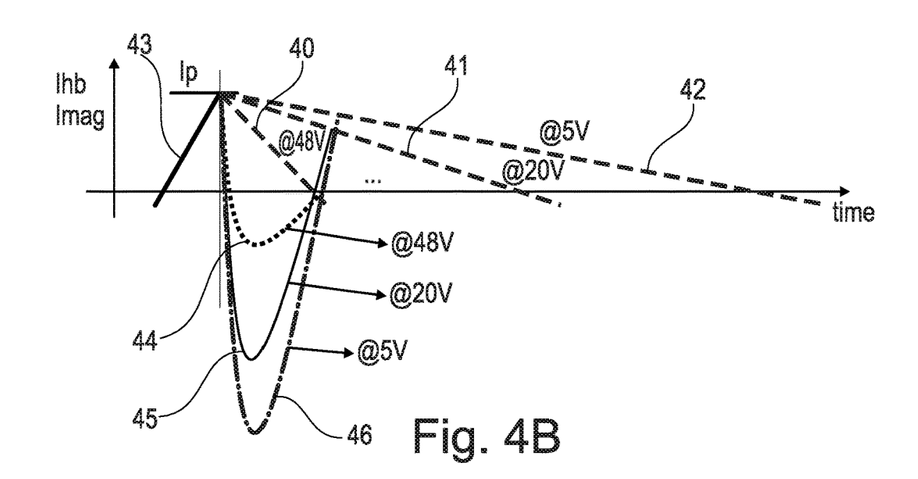
Figure 4C:
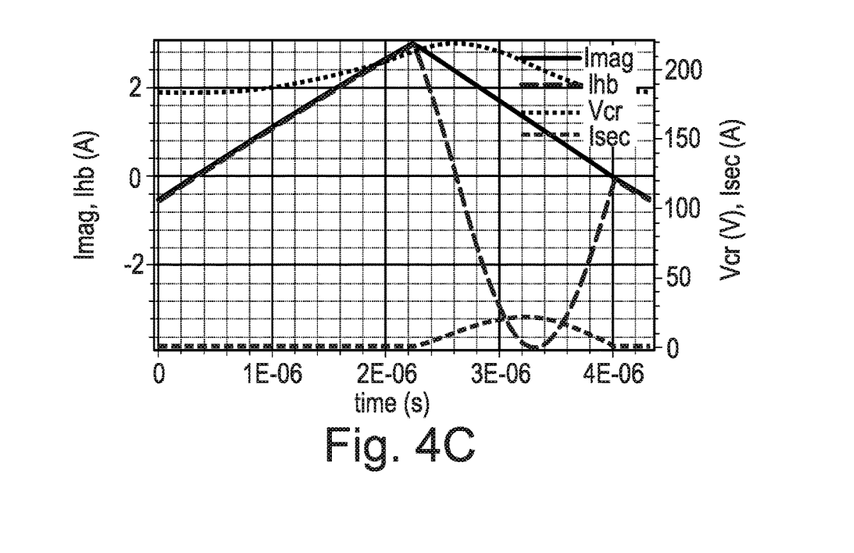

FIG. 4B additionally shows the current Ihb in the second phase (and partially in the third phase), as in the second phase the current Ihb differs from the magnetizing current Imag. This is also illustrated in FIG. 4C, where the magnetizing current Imag, the current Ihb, the voltage Vcr and the secondary current Isec are shown for the example of 48V of FIGS. 4A and 4B. In FIG. 4B, a curve 44 shows the current Ihb for a voltage of 48V, a curve 45 shows the current Ihb for a voltage of 20 volt, and a curve 46 shows the current Ihb for a voltage of 5 volt.

In the example shown, for 48V the demagnetization according to curve 40 "matches" the resonance of Ihb according to curve 44, i.e. they both arrive at about zero at the time td. This means that in this case, the third phase may have essentially zero length. However, for 20V and more pronounced for 5V output voltage, the demagnetization takes longer. In this case, as seen in FIG. 4B, Ihb transitions from negative values to positive values, which may lead to a high root mean square current in the third phase via the body diode in the conventional case, leading to losses. With implementations of low-side switching device S2 as discussed, which block this current, the energy is instead transferred to the secondary side.

Figure 4D:
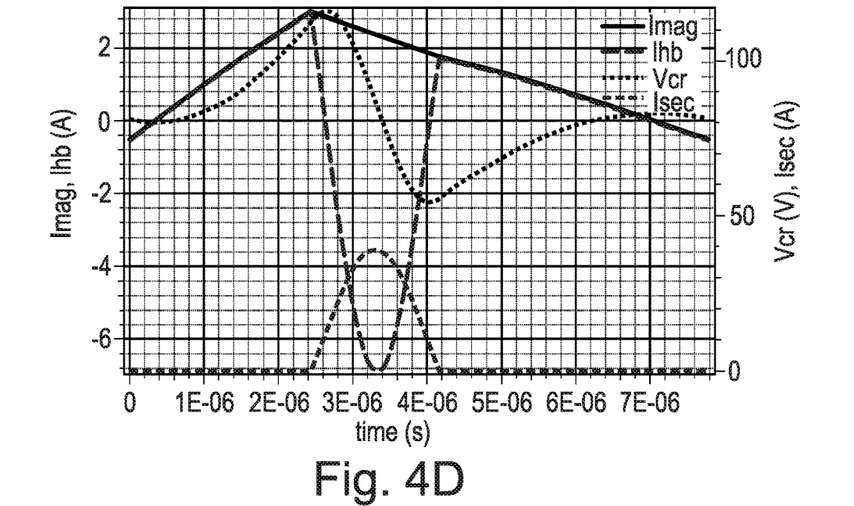

Such a high RMS value can be seen in FIG. 4D, which shows simulated waveforms similar to the ones shown in FIG. 4C but for an output voltage of 20V instead of 48V in FIG. 4C. Here, the peak in the secondary side current Isec is, for example, significantly higher, and the current Ihb rises to positive values, as seen in FIG. 4D.

Figure 4E:
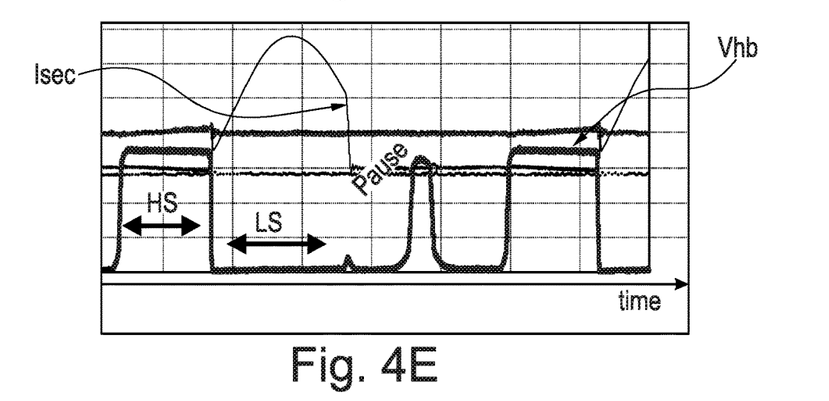
Figure 4F:
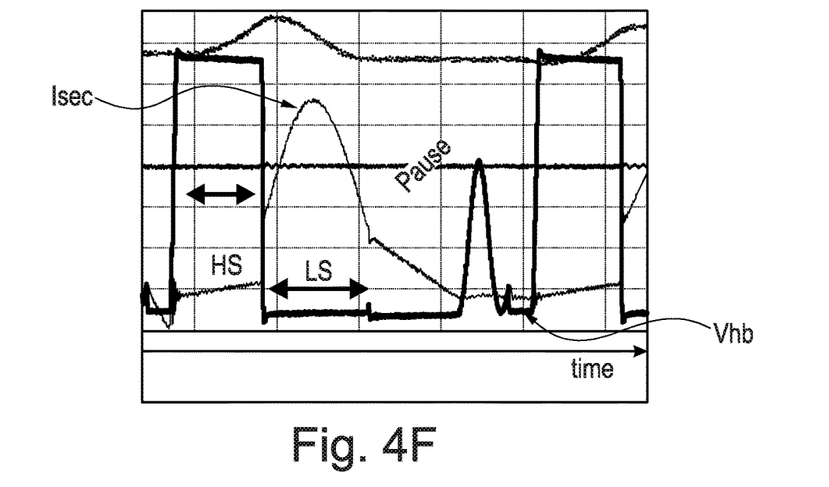

The energy transfer to the secondary side with the low-side switching device as used herein in contrast to the conventional case is also shown in FIGS. 4E and 4F, which show example signals, in particular Vhb and the secondary current Isec. In FIGS. 4E and 4F, similar to FIG. 2, HS indicates the first phase 20, LS indicates the second phase 21, and pause indicates the third phase 22. FIG. 4E shows the conventional case. Here, the secondary current Isec is "cut off" to 0 when the third phase, i.e. the pause phase begins. In FIG. 4F with a switching device S2 as discussed herein, the secondary side current Isec continues to flow in the pause phase, i.e. energy is still transferred to the secondary side.

Figure 5A:
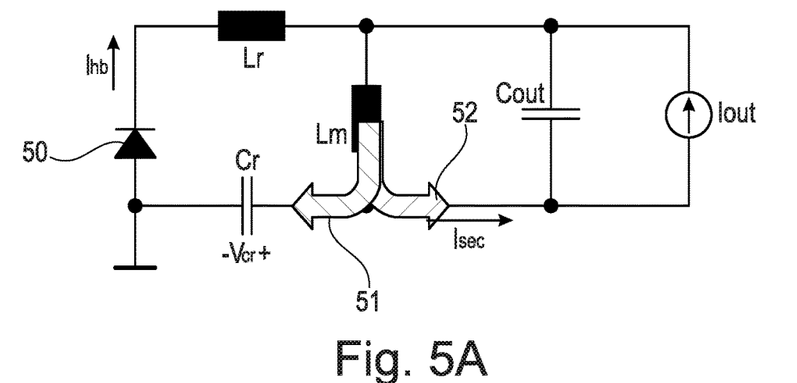
FIG. 5A illustrates operation of a flyback converter according to a reference example.

FIGS. 5A and 5B again visualize the effect of the present application. FIG. 5A shows the conventional case, similar to FIG. 3C, where in the third phase current as indicated by an arrow 51 flows via a body diode 50 of a transistor like a MOSFET used as low-side switching device S2. At best, a very small part as indicated by an arrow 52, is transferred to the secondary side.

Figure 5B:
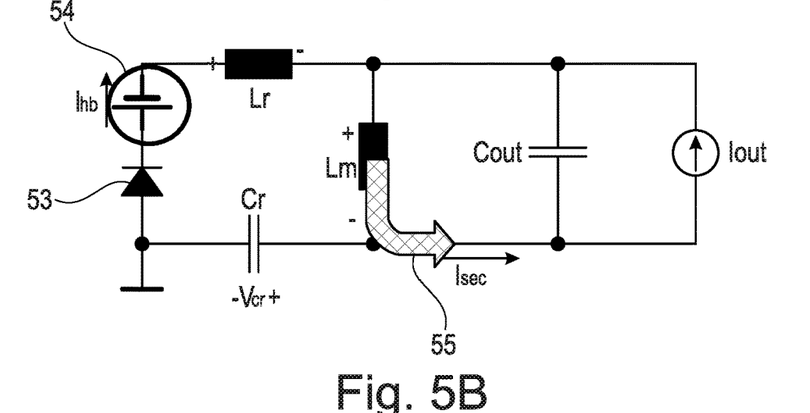
FIG. 5B illustrates operation of a flyback converter according to an embodiment.

In FIG. 5B the case is shown where the low-side switching device S2 is designed to block the current flow, which again is symbolized by an additional voltage source 54 preventing current flow via body diode 53. In this case, as indicated by arrow 55, essentially all the magnetizing energy is transferred to secondary side.

Next, various implementation possibilities for low-side switching device S2 will be discussed.

Figure 6A:
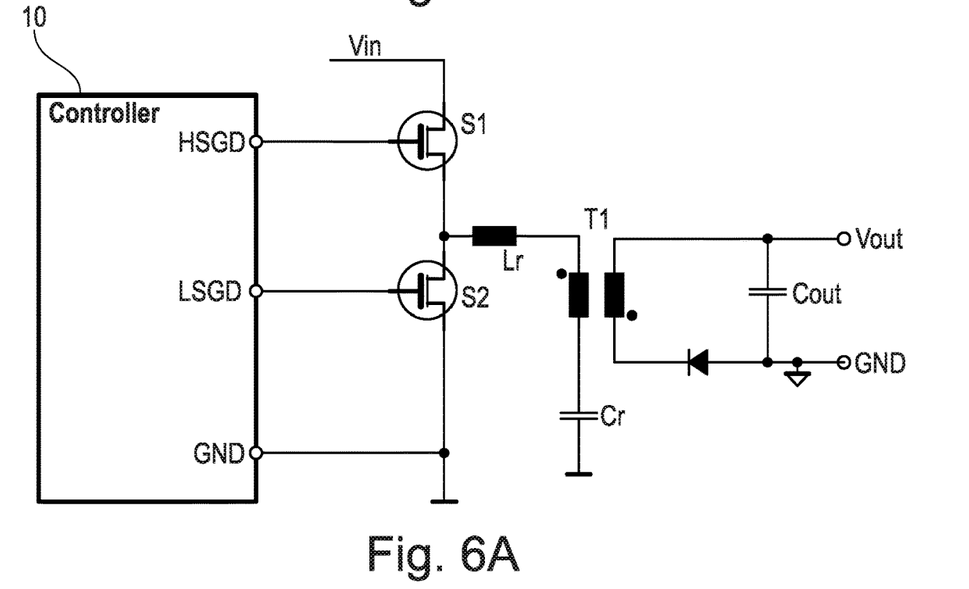
FIG. 6A illustrates a flyback converter according to an embodiment.
Figure 6B:
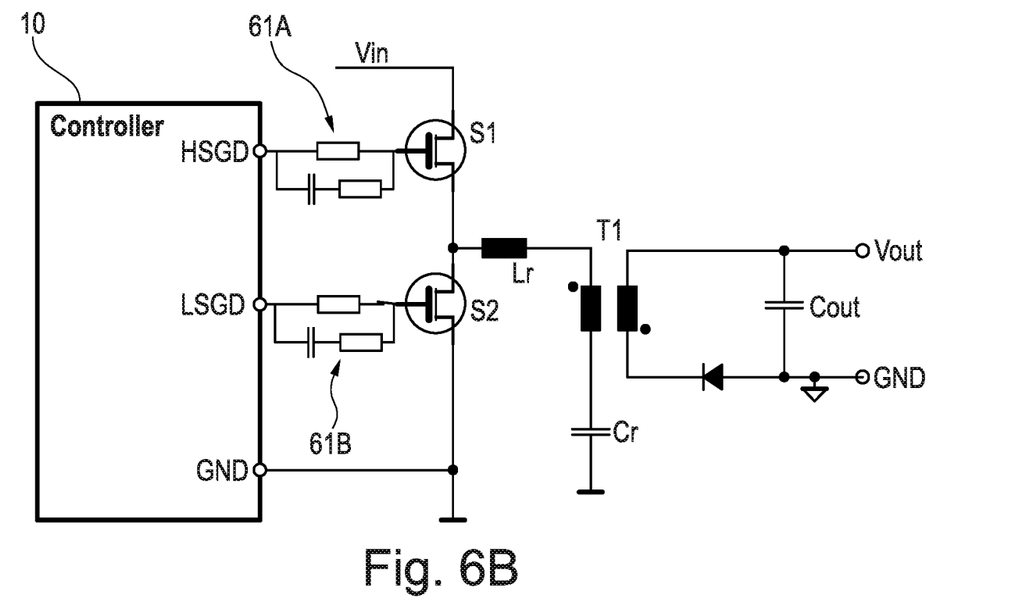
FIG. 6B illustrates a variation of the flyback converter of FIG. 6A.

In some embodiment, instead of the silicon-based MOSFET used in conventional devices, a wide band gap material based transistor, for example a Gallium Nitride (GaN) based transistor like a Gallium Nitride high electron mobility transistor (HEMT) is used. Other wide bandgap materials, e.g. having a bandgap of at least 2.0 eV, may also be used. Examples are shown in FIGS. 6A and 6B. Here, at least low-side switching device S2 is implemented as a GaN HEMT. High-side switching device S1 may be implemented as a conventional MOSFET, or as shown in FIGS. 6A and 6B may also be implemented as a GaN HEMT.

Generally, while GaN HEMTs may have body diodes, these body diodes may have a significantly higher forward threshold voltage (i.e. minimum voltage applied to the forward direction of the diode in order to generate significant current flow), which effectively corresponds to introducing a voltage source as voltage source V1 of FIG. 3D or 54 of FIG. 5B, or, in other words, bidirectionally prevents current flow when the low-side switching device is switched off. Other transistors having a blocking voltage of at least 5V in the reverse direction may also be used. As this blocking is in the "reverse direction" of the switching device S2 as a whole, it will also be referred to as reverse direction blocking herein, although it is related to the forward biasing of the body diode, in case the transistor has a body diode.

This voltage may be regulated by controller 10 by applying a corresponding gate source voltage to low-side switching device S2, in particular by applying a voltage to a gate terminal of low-side switching device, which is an example for a control terminal low-side switching device S2. Other types of switching devices may have a base terminal of a transistor as control terminal. As an example, in FIG. 6B, switching devices S1, S2 are controlled by controller 10 via an arrangement of gate resistors and capacitors 61A, 61B as shown.

In the arrangements 61A, 61B, the path with capacitor and resistor in series is the main turn-on and turn-off path for the transistor. When turning off it creates a negative voltage, which then goes back to 0V during off stage. This is helpful in some implementations for properly keeping turned off the GaN device during turning off transition. The only resistor path provides a small bias current during turn on phase for an internal diode structure at a gate within the GaN device. This structure may be used with some conventional GaN transistor implementations. In other implementations, other arrangements for gate biasing may be used.

Figure 6C:
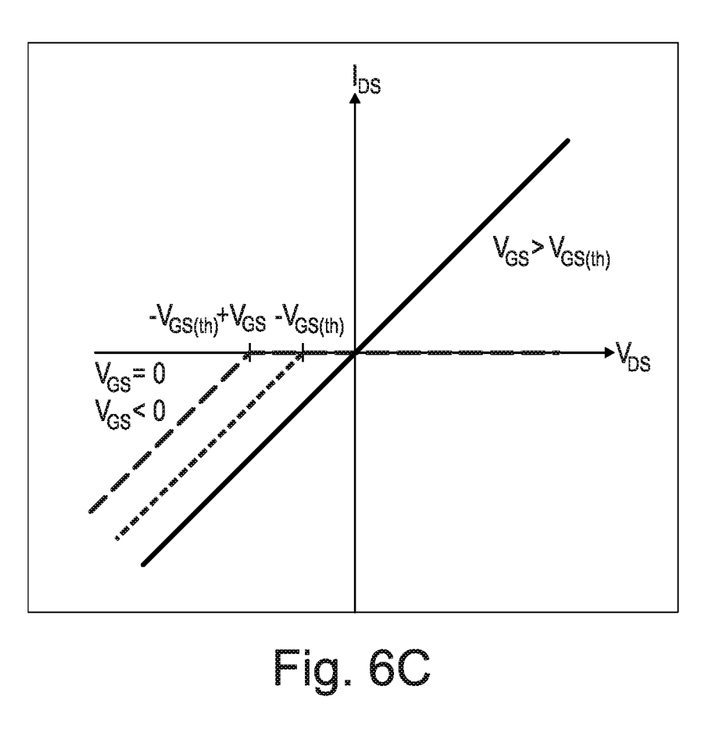
FIG. 6C illustrates the behaviour of a Gallium Nitride based transistor usable in some embodiments.

Controlling the reverse direction blocking voltage as mentioned above is illustrated in FIG. 6C, where for different gate source voltages the behaviour is shown. As can be seen, the reverse conduction characteristic of the HEMT (negative $V_{DS}$ in FIG. 6C) can be adjusted to achieve a positive gate source voltage $V_{GS}$, by applying a corresponding voltage to the gate. In this way, the blocking behaviour may be increased as necessary to prevent the current flow via low-side switching device S2 in the third phase.

Figure 7:
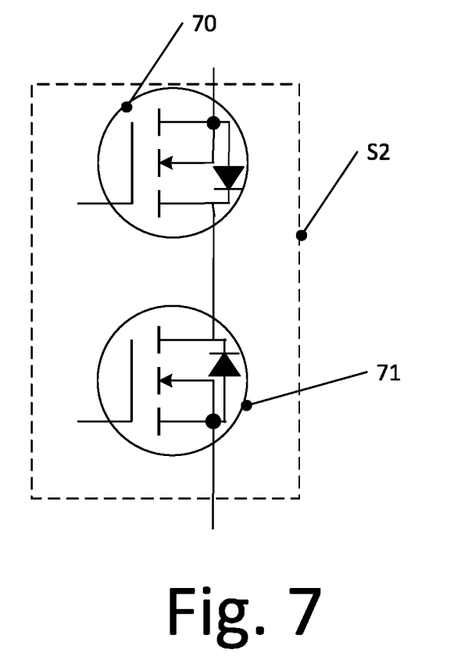
FIG. 7 illustrates a switching device usable in some embodiments.

FIG. 7 shows an alternative implementation for low-side switching device S2. Here, low-side switching device S2 is implemented as a bidirectional switch using two MOSFETs 70, 71 coupled in series such that the body diodes have opposite polarities as shown. In this way, when MOSFET 70, 71 are switched off, at least one of the body diodes is blocking, such that no current flows in the third phase.

Figure 8:
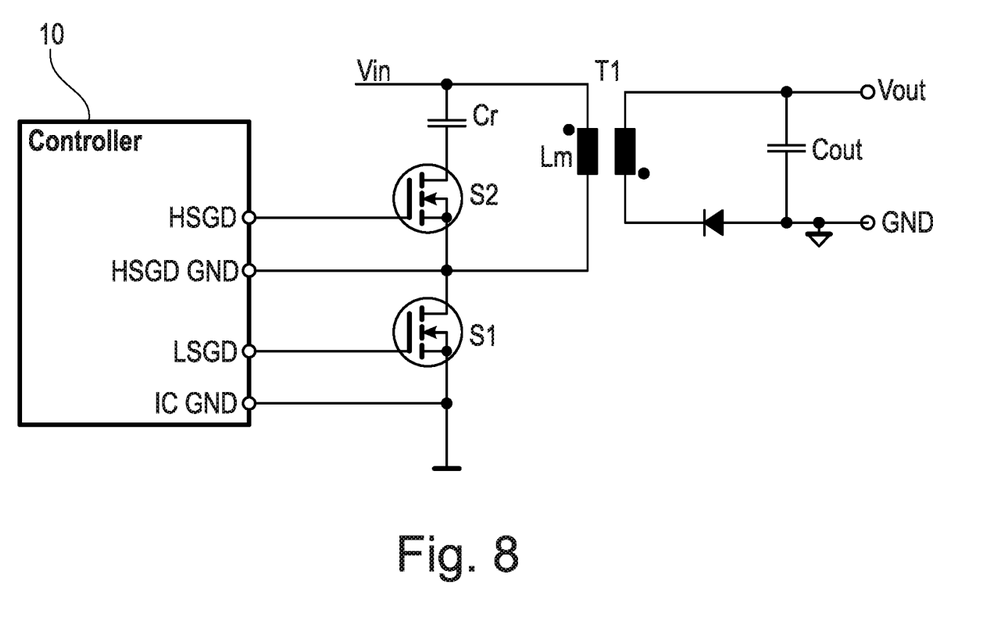
FIG. 8 illustrates a flyback converter according to a further embodiment.

In the embodiments discussed above, the resonant tank is in parallel to the low-side switch. The concepts discussed above may also be applied to embodiments where the resonant tank is in parallel to the high-side switching device. FIG. 8 shows such an embodiment. Here, capacitor Cr and primary side winding Lm are coupled in parallel to the high-side switching device, which in contrast to the previous Figures now is labelled S2, whereas the low-side switching device is labelled S1. This reverse labelling indicates that now the roles of the high-side switching device and the low-side switching device are reversed, i.e. in the first phase low-side switching device S1 is closed to charge the resonant tank, in the second phase high-side switching device S2 is closed to transfer energy to the secondary side, and to prevent the effects discussed above in the third phase, high-side switching device S2 in FIG. 8 is implemented to block current as explained above for low-side switching device S2 of the previous embodiments. In other words, all the explanations for high-side switching device S1 of the previous embodiments now apply to low-side switching device S1 of FIG. 1, and the explanations follow side switching device S2 of the previous embodiments now apply to high-side switching device S2.

Some embodiments are defined by the following examples:

Example 1. An asymmetric half bridge flyback converter, comprising:
  a first primary side switching device and a second primary side switching device coupled in series between a supply voltage and a reference potential,
  a transformer, wherein one end of a primary side winding of the transformer is coupled to a node between the first primary side switching device and the second primary side switching device,
  a capacitor, wherein a resonant circuit including at least the primary side winding and the capacitor is coupled in parallel to the second primary side switching device,
  a secondary side circuit coupled to a secondary side winding of the transformer, and
  a controller configured to control the first primary side switching device and the second primary side switching device such that for each switching cycle:
    in a first phase, the first primary side switching device allows current flow and the second primary side switching device blocks current flow in a first direction to supply power to the resonant circuit,
    in a second phase, the first primary side switching device blocks current flow and the second primary side switching device allows current flow, to transfer energy to the secondary side circuit, and in a third phase, the first primary side switching device blocks current flow and second primary side switching device blocks current flow also in a second direction opposite the first direction such that a remaining magnetizing energy of the transformer is discharged to the secondary side of the transformer.

Example 2. The converter of example 1, wherein the second primary side switching device is implemented as a transistor having a voltage drop for a current in the second direction greater than 2V.

Example 3. The converter of example 2, wherein the voltage drop is greater than 5V.

Example 4. The converter of example 2 or 3, wherein the voltage drop is across a reverse diode conducting path of the transistor.

Example 5. The converter of any one of examples 2 to 4, wherein the transistor is a transistor based on a semiconductor material having a bandgap greater than 2 eV.

Example 6. The converter of any one of examples 2 to 5, wherein the transistor is a Gallium Nitride, GaN, based transistor.

Example 7. The converter of example 6, wherein the transistor is a GaN high electron mobility transistor.

Example 8. The converter of any one of examples 2 to 7, wherein the controller is configured to set the voltage drop by applying a control voltage to a control terminal of the transistor.

Example 9. The converter of any one of examples 1 to 6, wherein, the second primary side switching device is implemented as a bidirectional switch.

Example 10. The converter of example 9, wherein the bidirectional switch comprises a series connection of two transistors, wherein reverse diode conducting paths of the two transistors have opposite directions.

Example 11. The converter of any one of examples 1 to 10, wherein the controller is configured to adjust the lengths of the first to third phases based on a required output voltage provided at the secondary side circuit.

Example 12. The converter of any one of examples 1 to 11, wherein the first primary side switching device is one of a high side switching device and a low side switching device, and the second primary side switching device is the other one of the high side switching device and the low side switching device.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. An asymmetric half bridge flyback converter, comprising:
    a first primary side switching device and a second primary side switching device coupled in series between a supply voltage and a reference potential,
    a transformer, wherein a first end of a primary side winding of the transformer is coupled to a node between the first primary side switching device and the second primary side switching device,
    a capacitor, wherein a resonant circuit including at least the primary side winding and the capacitor is coupled in parallel to the second primary side switching device,
    a secondary side circuit coupled to a secondary side winding of the transformer, and
    a controller configured to control the first primary side switching device and the second primary side switching device such that for each respective switching cycle of multiple switching cycles:
        in a first portion of a respective switching cycle, the first primary side switching device is operative to allow current flow and the second primary side switching device is operative to block current flow in a first direction to supply power to the resonant circuit,
        in a second portion of the respective switching cycle, the first primary side switching device is operative to block current flow and the second primary side switching device is operative to allow current flow, to transfer energy to the secondary side circuit, and
        in a third portion of the respective switching cycle, the first primary side switching device is operative to block current flow and second primary side switching device is operative to block current flow also in a second direction opposite the first direction such that a remaining magnetizing energy of the transformer is discharged to the secondary side circuit.

2. The asymmetric half bridge flyback converter of claim 1, wherein the second primary side switching device is implemented as a transistor having a voltage drop for a current in the second direction greater than 2V.

3. The asymmetric half bridge flyback converter of claim 2, wherein the voltage drop is greater than 5V.

4. The asymmetric half bridge flyback converter of claim 2, wherein the voltage drop is across a reverse diode conducting path of the transistor.

5. The asymmetric half bridge flyback converter of claim 2, wherein the transistor is fabricated based on a semiconductor material having a bandgap greater than 2eV.

6. The asymmetric half bridge flyback converter of claim 2, wherein the transistor is a Gallium Nitride, GaN, based transistor.

7. The asymmetric half bridge flyback converter of claim 6, wherein the transistor is a Gallium Nitride high electron mobility transistor.

8. The asymmetric half bridge flyback converter of claim 2, wherein the controller is configured to set the voltage drop by applying a control voltage to a control terminal of the transistor.

9. The asymmetric half bridge flyback converter of claim 1, wherein the second primary side switching device is implemented as a bidirectional switch.

10. The asymmetric half bridge flyback converter of claim 9, wherein the bidirectional switch comprises a series connection of two transistors, wherein reverse diode conducting paths of the two transistors have opposite directions.

11. The asymmetric half bridge flyback converter of claim 1, wherein the controller is configured to adjust durations of the first to third portions based on a required output voltage provided at the secondary side circuit.

12. The asymmetric half bridge flyback converter of claim 1, wherein the first primary side switching device is a high side switching device, and the second primary side switching device is a low side switching device.

13. An apparatus comprising:
    a controller operative to:
        control operation of first switch circuitry and second switch circuitry to supply input current to a resonant circuit path, the resonant circuit path including a primary winding of a transformer and a capacitor, a secondary winding of the transformer inductively coupled to the primary winding of the transformer, the secondary winding operative to produce an output current supplied to a load;

wherein the controlled operation in a respective control cycle of controlling the first switch circuitry and the second switch circuitry includes simultaneous deactivation of both the first switch circuitry and the second switch circuitry in a first portion of the respective control cycle during which magnetizing energy associated with the primary winding of the transformer is discharged through the transformer to the secondary winding of the transformer to produce the output current;

wherein the deactivation of the first switch circuitry in the first portion of the respective control cycle is operative to prevent a flow of first current from the first switch circuitry through the primary winding; and wherein the deactivation of the second switch circuitry in the first portion of the respective control cycle is operative to prevent a flow of second current from the second switch circuitry through the primary winding;

wherein a first terminal node of the resonant circuit path is directly connected to a first node of the first switch circuitry:

wherein a second terminal node of the resonant circuit path is directly connected to a second node of the first switch circuitry; and wherein the first switch circuitry is first bidirectional switch circuitry fabricated from a first set of transistors, the first bidirectional switch circuitry operative to block current through the first switch circuitry in both directions during deactivation of the first switch circuitry.

14. The apparatus as in claim 13, wherein the first switch circuitry is low side switch circuitry of a power converter; and wherein the second switch circuitry is high side switch circuitry of the power converter.

15. The apparatus as in claim 13, wherein the first switch circuitry includes a first inherent diode;

wherein the second switch circuitry includes a second inherent diode; and wherein neither the first inherent diode nor the second inherent diode is operative to contribute to the flow of the input current through the resonant circuit path during the first portion of the respective control cycle.

16. The apparatus in claim 15, wherein the controller is further operative to: i) simultaneously deactivate the first switch circuitry and the second switch circuitry during the first portion of the respective control cycle, ii) activate the first switch circuitry and deactivate the second switch circuitry during a second portion of the respective control cycle, and iii) deactivate the first switch circuitry and activate the second switch circuitry during a third portion of the respective control cycle.

17. The apparatus as in claim 13, wherein the first set of transistors include a first field effect transistor and a second field effect transistor; and wherein a drain node of the first field effect transistor is directly connected to a drain node of the second field effect transistor.

18. The apparatus in claim 17, wherein the controller is further operative to: i) simultaneously deactivate the first switch circuitry and the second switch circuitry during the first portion of the respective control cycle, ii) activate the first switch circuitry and deactivate the second switch circuitry during a second portion of the respective control cycle, and iii) deactivate the first switch circuitry and activate the second switch circuitry during a third portion of the respective control cycle.

19. The apparatus as in claim 13, wherein a magnitude of the magnetizing energy associated with the primary winding during the first portion of the respective control cycle varies depending upon a magnitude of the output current.

20. The apparatus as in claim 13, wherein the first switch circuitry is fabricated using a semiconductor material having a bandgap greater than 2eV.

21. The apparatus as in claim 20, wherein the first set of transistors is fabricated via a Gallium Nitride (GaN) technology.

22. The apparatus as in claim 20, wherein the first switch circuitry includes a series connection of two transistors, wherein reverse diode conducting paths of each of the two transistors are disposed in opposite directions to block flow of current through the first switch circuitry.

23. The apparatus as in claim 13, wherein the magnetizing energy associated with the primary winding of the transformer is discharged through the transformer from the primary winding to the secondary winding to produce the output current during the first portion of the respective control cycle in which no current flows through the primary winding.

* * * * *